United States Patent
Li et al.

(10) Patent No.: US 12,098,267 B2
(45) Date of Patent: Sep. 24, 2024

(54) FRIABLE BALES

(71) Applicant: Dow Global Technologies LLC, Midland, MI (US)

(72) Inventors: Guang Ming Li, Sugar Land, TX (US); Shrikant Dhodapkar, Lake Jackson, TX (US); Rerni A. Trottier, Angleton, TX (US); Gerrit Grootenzerink, Horgen (CH); Jozef J. I. Van Dun, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 940 days.

(21) Appl. No.: 17/256,996

(22) PCT Filed: Jun. 6, 2019

(86) PCT No.: PCT/US2019/035753
§ 371 (c)(1),
(2) Date: Dec. 29, 2020

(87) PCT Pub. No.: WO2020/005493
PCT Pub. Date: Jan. 2, 2020

(65) Prior Publication Data
US 2021/0380790 A1    Dec. 9, 2021

Related U.S. Application Data

(60) Provisional application No. 62/692,338, filed on Jun. 29, 2018.

(51) Int. Cl.
C08L 23/16    (2006.01)
B29B 9/16    (2006.01)
(Continued)

(52) U.S. Cl.
CPC ............... *C08L 23/16* (2013.01); *B29B 9/16* (2013.01); *B29B 15/026* (2013.01); *C08K 5/098* (2013.01);
(Continued)

(58) Field of Classification Search
CPC ......... C08L 23/16; B29B 9/16; B29B 15/026; B29B 2009/163; C08K 5/098; C09D 183/04
See application file for complete search history.

(56) References Cited

U.S. PATENT DOCUMENTS 3,775,933 A    12/1973    Prescott et al.
4,027,067 A *  5/1977    Wagner .................... C08J 3/124
                                                         524/904
(Continued)

FOREIGN PATENT DOCUMENTS

CA    2029486 A1    5/1991
EP    0050039 A2    4/1982
(Continued)

OTHER PUBLICATIONS

PCT/US2019/035753, International Search Report and Written Opinion with a mailing date of Sep. 20, 2019.

*Primary Examiner* — Alexander C Kollias

(57) ABSTRACT

A process to make a friable bale, and a friable bale formed from the same, wherein the friable bale is formed from a composition comprising coated polymer particles, which comprise polymer particles formed from a polymer composition comprising an olefin-based polymer, and a coating formed from a coating composition comprising an aqueous metal acid dispersion, and an aqueous polysiloxane emulsion, and wherein the friable bale has a compression force ≤1.00 MPa.

14 Claims, 1 Drawing Sheet

(51) Int. Cl.
  *B29B 15/02* (2006.01)
  *C08K 5/098* (2006.01)
  *C09D 7/63* (2018.01)
  *C09D 183/04* (2006.01)
  *B29K 23/00* (2006.01)
  *B29K 483/00* (2006.01)

(52) U.S. Cl.
  CPC ............ *C09D 7/63* (2018.01); *C09D 183/04* (2013.01); *B29B 2009/163* (2013.01); *B29K 2023/16* (2013.01); *B29K 2483/00* (2013.01); *C08L 2207/53* (2013.01)

(56) References Cited

U.S. PATENT DOCUMENTS

| | | | |
|---|---|---|---|
| 4,207,218 A | 6/1980 | Jorgensen, Jr. et al. | |
| 4,501,859 A * | 2/1985 | Newman | C08C 19/12 |
| | | | 525/356 |
| 4,960,644 A | 10/1990 | Hyche et al. | |
| 5,007,961 A | 4/1991 | Hyche et al. | |
| 5,068,256 A | 11/1991 | Nakahara et al. | |
| 5,096,493 A | 3/1992 | Hyche et al. | |
| 5,334,644 A | 8/1994 | Gose et al. | |
| 5,443,910 A | 8/1995 | Gose et al. | |
| 6,228,902 B1 | 5/2001 | Brueggeman et al. | |
| 6,403,677 B1 | 6/2002 | Walker | |
| 7,122,584 B2 | 10/2006 | Moriya et al. | |
| 8,568,879 B2 | 10/2013 | Chereau et al. | |
| 9,169,374 B2 | 10/2015 | Hernandez-Zamora et al. | |
| 9,290,668 B2 | 3/2016 | Dhodapkar et al. | |
| 9,353,230 B2 | 5/2016 | Chiba et al. | |
| 9,758,626 B2 | 9/2017 | Armstrong et al. | |
| 2010/0124607 A1* | 5/2010 | Berti | C08J 3/124 |
| | | | 427/207.1 |
| 2013/0101852 A1 | 4/2013 | Dhodapkar et al. | |
| 2020/0002576 A1* | 1/2020 | Kamimura | B32B 17/1055 |
| 2021/0155798 A1 | 5/2021 | Schaffer et al. | |

FOREIGN PATENT DOCUMENTS

| | | |
|---|---|---|
| EP | 365202 A2 | 4/1990 |
| EP | 427339 A2 | 5/1991 |
| EP | 0749454 A1 | 12/1996 |
| WO | 2001012716 A2 | 2/2001 |
| WO | 2004/058480 A1 | 7/2004 |
| WO | 2009/035877 A1 | 3/2009 |
| WO | 2017049064 A1 | 3/2017 |
| WO | 2020/006396 A1 | 1/2020 |

* cited by examiner

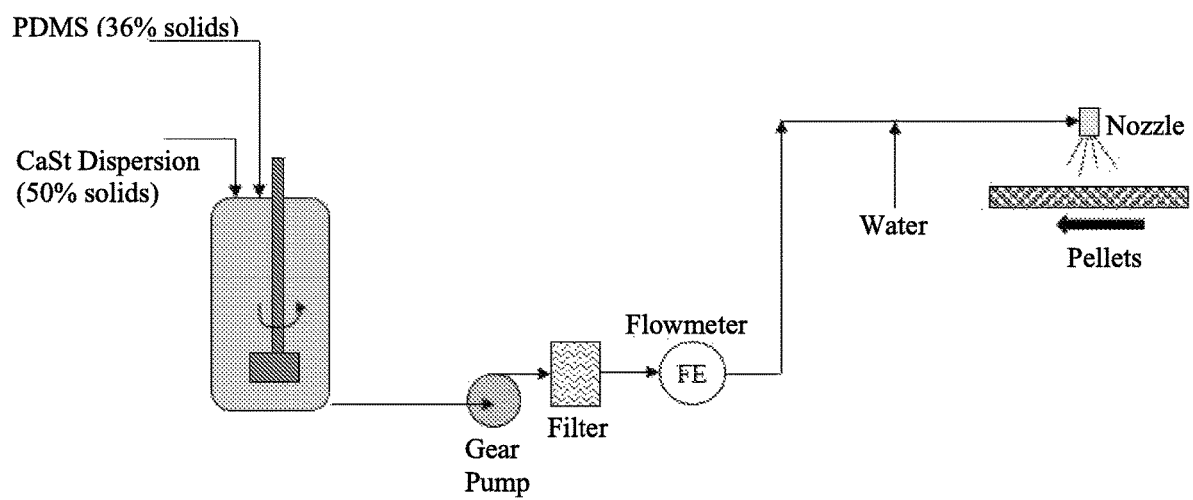

FRIABLE BALES

BACKGROUND

The appearance of golf-ball sized, undispersed lumps (i.e., "eggs") of EPDM rubber are regularly observed by the EPDM compounders, during the compounding process. The issue is especially pronounced with the amorphous EPDM bale products. This phenomenon occurs in variety of mixing situations, and more frequently in colder climates, when the EPDM bale temperature is below about 10° C. The formation of "eggs" is related to the bale-material intake behavior in an internal mixer. A lower bale modulus will improve the intake behavior, which related to the friability of bale (i.e., friable bale versus dense bale). Friable bale EPDM products exhibited much less coherence force than dense bale EPDM products under shear conditions. Therefore dense bales are more prone to egg formation than friable bales during the mixing.

Amorphous EPDM products based on single site catalysts, and solution processes, are typically produced in pellets first, and the pellets packed in bags, which are shipped and stored in a box. During the shipping and storage phase, the pellets in the lower stack of bags in the box, mass together to improve the friability of the bale, and thus, improve the mixing quality, significant amounts of partitioning agents need to be applied to surface of the pellets before the pellets form bales.

Polymer pellets, coating compositions and baling processes, are described in the following references: EP365202A2/JP02814609B2, U.S. Pat. Nos. 4,207,218, 3,775,933, EP427339(B1)/CA2029486C, WO2004058480, WO 2017/049064, WO 2001/012716, WO 2009/035877, U.S. Pat. Nos. 4,960,644; 5,007,961; 5,096,493; 5,334,644; 5,443,910; 6,403,677; Walker, EP 0749454 A1; and US Patent Publication: US 2013/0101852.

Thus, there is a need for improved polymer bales, and process for the same, which bales are readily friable. This need is provided by the following invention.

SUMMARY OF THE INVENTION

A process to make a friable bale, wherein the friable bale is formed from a composition comprising coated polymer particles, which comprise polymer particles formed from a polymer composition comprising an olefin-based polymer, and a coating formed from a coating composition comprising an aqueous metal acid dispersion, and an aqueous polysiloxane emulsion, said process comprising the following:
  a) adding the coated polymer particles to a container;
  b) allowing the coated polymer particles to mass together to form the friable bale;
  and wherein the friable bale has a compression force ≤1.00 MPa.

A process to make a friable bale, wherein the friable bale is formed from a composition comprising coated polymer particles, which comprise polymer particles formed from a polymer composition comprising an olefin-based polymer, and a coating formed from a coating composition comprising an aqueous metal acid dispersion, and an aqueous polysiloxane emulsion, said process comprising adding the coated polymer particles to a baling machine to form the friable bale; and wherein the friable bale has a compression force ≤1.00 MPa.

A friable bale comprising coated polymer particles, which comprise polymer particles formed from a polymer composition comprising an olefin-based polymer, and a coating formed from a coating composition comprising an aqueous metal acid dispersion, and an aqueous polysiloxane emulsion; and
  wherein the metal acid is present in an amount from greater than zero to 5000 ppm, based on the weight of the coated polymer particles; and
  wherein the polysiloxane is present in an amount from greater than zero to 2000 ppm, based on the weight of the coated polymer particles.

BRIEF DESCRIPTION OF THE DRAWINGS

FIG. 1 depicts a coating process using a pre-mix of the aqueous metal acid dispersion and the aqueous polysiloxane emulsion.

DETAILED DESCRIPTION

Processes for forming friable bales, and such bales, have been discovered, which provide for excellent handling and compounding.

As discussed above, in a first aspect, a process to make a friable bale, wherein the friable bale is formed from a composition comprising coated polymer particles, which comprise polymer particles formed from a polymer composition comprising an olefin-based polymer, and a coating formed from a coating composition comprising an aqueous metal acid dispersion, and an aqueous polysiloxane emulsion, said process comprising the following:
  a) adding the coated polymer particles to a container;
  b) allowing the coated polymer particles to mass together to form the friable bale;
  and wherein the friable bale has a compression force ≤1.00 MPa. As used herein, the coated polymer particles are massed together when ≥50 wt % of the particles (based on the total weight of the particles) are stuck or fused together.

In a second aspect, a process to make a friable bale, wherein the friable bale is formed from a composition comprising coated polymer particles, which comprise polymer particles formed from a polymer composition comprising an olefin-based polymer, and a coating formed from a coating composition comprising an aqueous metal acid dispersion, and an aqueous polysiloxane emulsion, said process comprising adding the coated polymer particles to a baling machine to form the friable bale; and wherein the friable bale has a compression force ≤1.00 MPa.

In a third aspect, a friable bale comprising coated polymer particles, which comprise polymer particles formed from a polymer composition comprising an olefin-based polymer, and a coating formed from a coating composition comprising an aqueous metal acid dispersion, and an aqueous polysiloxane emulsion; and
  wherein the metal acid is present in an amount from greater than zero to 5000 ppm, based on the weight of the coated polymer particles; and
  wherein the polysiloxane is present in an amount from greater than zero to 2000 ppm, based on the weight of the coated polymer particles.

An inventive process may comprise a combination of two or more embodiments described herein.

A friable bale may comprise a combination of two or more embodiments described herein.

The following embodiments, except where noted, apply to all three aspects described above.

In one embodiment, or a combination of embodiments describe herein, the weight ratio of the polysiloxane to the metal acid, in the coating, is from 0.10 to 10.0, or 0.15 to 8.00, or 0.20 to 5.00.

In one embodiment, or a combination of embodiments describe herein, the weight ratio of the polysiloxane to the metal acid, in the coating, is from 0.10 to 1.00, or 0.10 to 0.80, or 0.10 to 0.60, or 0.10 to 0.50, or 0.10 to 0.40, or 0.10 to 0.30.

In one embodiment, or a combination of embodiments describe herein, wherein the metal acid is present in an amount from greater than zero to 5000 ppm, or greater than zero to 2000 ppm, or greater than zero to 1000 ppm, or greater than zero to 500 ppm, or greater than zero to 300 ppm, based on the weight of the coated polymer particles.

In one embodiment, or a combination of embodiments describe herein, wherein the metal acid is present in an amount from 20 ppm to 5000 ppm, or from 20 ppm to 2000 ppm, or from 20 ppm to 1000 ppm, or from 20 ppm to 500 ppm, or from 20 ppm to 300 ppm, based on the weight of the coated polymer particles.

In one embodiment, or a combination of embodiments describe herein, wherein the polysiloxane is present in an amount greater than zero to 2000 ppm, or greater than zero to 1000 ppm, or greater than zero to 700 ppm, or greater than zero to 500 ppm, or greater than zero to 300 ppm, based on the weight of the coated polymer particles.

In one embodiment, or a combination of embodiments describe herein, wherein the polysiloxane is present in an amount from 20 ppm to 2000 ppm, or from 20 ppm to 1000 ppm, or from 20 ppm to 700 ppm, or from 20 ppm to 500 ppm, or from 20 ppm to 300 ppm, based on the weight of the coated polymer particles.

In one embodiment, or a combination of embodiments describe herein, the metal acid is present in an amount from greater than zero to 300 ppm, or from greater than zero to 250 ppm, or from greater than zero to 200 ppm, based on the weight of the coated polymer particles.

In one embodiment, or a combination of embodiments describe herein, the metal acid is present in an amount from 20 ppm to 300 ppm, or from 20 ppm to 250 ppm, or from 20 ppm to 200 ppm, based on the weight of the coated polymer particles.

In one embodiment, or a combination of embodiments describe herein, the polysiloxane is present in an amount from greater than zero to 300 ppm, or from greater than zero to 250 ppm, or from greater than zero to 200 ppm based on the weight of the coated polymer particles.

In one embodiment, or a combination of embodiments describe herein, the polysiloxane is present in an amount from 20 ppm to 300 ppm, or from 30 ppm to 300 ppm, or from 40 ppm to 300 ppm, or from 50 ppm to 300 ppm, based on the weight of the coated polymer particles.

In one embodiment, or a combination of embodiments describe herein, wherein metal of the metal acid is selected from calcium, zinc or barium.

In one embodiment, or a combination of embodiments describe herein, the metal acid comprises a metal stearate, and further a calcium stearate.

In one embodiment, or a combination of embodiments describe herein, the metal acid is comprises a metal stearate, and further a calcium stearate, and a metal C16 fatty acid, and further a calcium C16 fatty acid.

In one embodiment, or a combination of embodiments describe herein, the metal acid is calcium stearate.

In one embodiment, or a combination of embodiments describe herein, the polysiloxane is polydimethylsiloxane (PDMS).

In one embodiment, or a combination of embodiments describe herein, the dispersion/emulsion mixture is added to pelletization water, and wherein the polymer particles are added to the pelletization water.

In one embodiment, or a combination of embodiments describe herein, the aqueous metal acid dispersion or the aqueous polysiloxane emulsion is added to pelletization water, and wherein the polymer particles are added to the pelletization water.

In one embodiment, or a combination of embodiments describe herein, a mixture of the dispersion and the emulsion is sprayed onto the surface of the polymer particles.

In one embodiment, or a combination of embodiments describe herein, the aqueous dispersion and/or the aqueous emulsion is sprayed onto the surface of the polymer particles.

In one embodiment, or a combination of embodiments describe herein, the wet-coated polymer particles are dried by air drying at ambient temperature, hot-air drying, vacuum drying, or heating.

In one embodiment, or a combination of embodiments describe herein, the coating composition is not crosslinked. As used herein, the term "crosslinking" refers to at least 50 wt % of the composition remains insoluble after refluxing in xylene, at a temperature of 140° C. (boiling point of xylene, reflux) for 12 hours. See ASTM D2765.

In one embodiment, or a combination of embodiments describe herein, the polymer particles are in the form of pellets.

In one embodiment, or a combination of embodiments describe herein, the coating comprises <0.10 wt %, or <0.05 wt %, or <0.01 wt % of an amide-containing compound or an amide-containing polymer, each based on the weight of the coating. In a further embodiment, the coating does not comprise an amide-containing compound of an amide-containing polymer.

In one embodiment, or a combination of embodiments describe herein, the polymer composition comprises ≤0.10 wt %, or ≤0.05 wt %, or ≤0.01 wt % of an amide-containing compound or an amide-containing polymer, each based on the weight of the polymer composition. In a further embodiment, the polymer composition does not comprise an amide-containing compound of an amide-containing polymer.

In one embodiment, or a combination of embodiments describe herein, the coating comprises ≤0.10 wt %, or ≤0.05 wt %, or ≤0.01 wt % of an acid-containing compound or an acid-containing polymer, each based on the weight of the coating. In a further embodiment, the coating does not comprise an acid-containing compound of an acid-containing polymer.

In one embodiment, or a combination of embodiments describe herein, the polymer composition comprises ≤0.10 wt %, or ≤0.05 wt %, or ≤0.01 wt % of an acid-containing polymer, based on the weight of the polymer composition. In a further embodiment, the polymer composition does not comprise an acid-containing polymer.

In one embodiment, or a combination of embodiments describe herein, the coating comprises ≤0.10 wt %, or ≤0.05 wt %, or ≤0.01 wt % of EVA, based on the weight of the coating. In a further embodiment, the coating does not comprise EVA.

In one embodiment, or a combination of embodiments describe herein, the polymer composition comprises ≤0.10 wt %, or ≤0.05 wt %, or ≤0.01 wt % of EVA, based on the weight of the polymer composition. In a further embodiment, the polymer composition does not comprise EVA.

In one embodiment, or a combination of embodiments describe herein, the coating comprises ≤0.10 wt %, or ≤0.05 wt %, or ≤0.01 wt % of a propylene-based polymer, based on the weight of the coating. In a further embodiment, the coating does not comprise a propylene-based polymer.

In one embodiment, or a combination of embodiments describe herein, the polymer composition comprises ≤0.10 wt %, or ≤0.05 wt %, or ≤0.01 wt % of a propylene-based polymer, based on the weight of the polymer composition. In a further embodiment, the polymer composition does not comprise a propylene-based polymer.

In one embodiment, or a combination of embodiments describe herein, the coating comprises ≤0.10 wt %, or ≤0.05 wt %, or ≤0.01 wt % of a polymer containing, in polymerized form, styrene, based on the weight of the coating. In a further embodiment, the coating does not comprise a polymer containing, in polymerized form, styrene.

In one embodiment, or a combination of embodiments describe herein, the polymer composition comprises ≤0.10 wt %, or ≤0.05 wt %, or ≤0.01 wt % of a polymer containing, in polymerized form, styrene, based on the weight of the polymer composition. In a further embodiment, the polymer composition does not comprise a polymer containing, in polymerized form, styrene.

In one embodiment, or a combination of embodiments describe herein, the coating comprises ≤0.10 wt %, or ≤0.05 wt %, or ≤0.01 wt % of a fluoro-containing polymer, based on the weight of the coating. In a further embodiment, the coating does not comprise a fluoro-containing polymer.

In one embodiment, or a combination of embodiments describe herein, the polymer composition comprises ≤0.10 wt %, or ≤0.05 wt %, or ≤0.01 wt % of a fluoro-containing polymer, based on the weight of the polymer composition. In a further embodiment, the polymer composition does not comprise a fluoro-containing polymer.

In one embodiment, or a combination of embodiments describe herein, the coating comprises ≤0.10 wt %, or ≤0.05 wt %, or ≤0.01 wt % of a polyurethane, based on the weight of the coating. In a further embodiment, the coating does not comprise a polyurethane.

In one embodiment, or a combination of embodiments describe herein, the polymer composition comprises ≤0.10 wt %, or ≤0.05 wt %, or ≤0.01 wt % of a polyurethane, based on the weight of the polymer composition. In a further embodiment, the polymer composition does not comprise a polyurethane.

In one embodiment, or a combination of embodiments describe herein, the coating comprises ≤0.10 wt %, or ≤0.05 wt %, or ≤0.01 wt % of wax, based on the weight of the coating. In a further embodiment, the coating does not comprise a wax.

In one embodiment, or a combination of embodiments describe herein, the polymer composition comprises ≤0.10 wt %, or ≤0.05 wt %, or ≤0.01 wt % of wax, based on the weight of the polymer composition. In a further embodiment, the polymer composition does not comprise a wax.

As used herein, the term "wax," refers to an ethylene-based polymer that has a melt viscosity, at 177° C., ≤5,000 cP, and is a solid at 23° C. and one atmosphere, or a propylene-based polymer that has a melt viscosity, at 230° C., ≤5,000 cP, and is a solid at 23° C. and one atmosphere, or a polysiloxane that has a melt viscosity, at 145° C., ≤5,000 cP, and is a solid at 23° C. and one atmosphere.

In one embodiment, or a combination of embodiments describe herein, the olefin-based polymer is an ethylene-based polymer of a propylene-based polymer.

In one embodiment, or a combination of embodiments describe herein, the olefin-based polymer is an ethylene-based polymer. In a further embodiment, the ethylene-based polymer has a melt index (I2) from 0.5 to 2000 g/10 min, or from 1.0 to 1000 g/10 min, or from 5.0 to 500 g/10 min, or from 10 to 100 g/10 min.

Examples of ethylene-based polymers include low density polyethylene (LDPE), high density polyethylene (HDPE), heterogeneously branched linear polymers (include Ziegler-Natta polymerized polymers, such as LLDPE, and include products such as DOWLEX Linear Low Density Polyethylene (LLDPE) available from The Dow Chemical Company), homogeneously branched substantially linear polymer (such as AFFINITY Polyolefin Plastomers and ENGAGE Polyolefin Elastomers, both available from The Dow Chemical Company) homogeneously branched linear polymers (such as EXACT Polymers available from ExxonMobil), olefin multiblock copolymers (such as INFUSE Olefin Block Copolymers available from The Dow Chemical Company), NORDEL EPDM resins, available from The Dow Chemical Company, and olefin block composites (such as INTUNE available from the Dow Chemical Company). Other examples of ethylene-based polymers include ethylene-based copolymers formed from high pressure, free-radical polymerizations. Examples polymers include SURLYN, BYNEL, ELVAX, NUCREL (DuPont) and DUTRAL (Versalis).

In one embodiment, or a combination of embodiments describe herein, the olefin-based polymer is an ethylene/alpha-olefin interpolymer, and further an ethylene/alpha-olefin copolymer. Example alpha-olefins are those having from 3 to 8 carbon atoms, such as propylene, 1-butene, 1-pentene, 1-hexene, 1-heptene, and 1-octene.

In one embodiment, or a combination of embodiments describe herein, the olefin-based polymer is a propylene-based polymer. In a further embodiment, the propylene-based polymer is a propylene/alpha-olefin interpolymer, and further a propylene/alpha-olefin copolymer, or a propylene/ethylene interpolymer, and further a propylene/ethylene copolymer. Example alpha-olefins include 1-butene, 1-pentene, 1-hexene, 1-heptene, and 1-octene. Propylene-based polymers include VERSIFY Polyolefin Elastomers available from the Dow Chemical Company, and VISTAMAXX polymers available from ExxonMobil.

In one embodiment, or a combination of embodiments describe herein, the propylene-based polymer has a melt flow rate (MFR) from 0.5 to 2000 g/10 min, or from 1.0 to 1000 g/10 min, or from 5.0 to 500 g/10 min, or from 10 to 100 g/10 min.

In one embodiment, or a combination of embodiments describe herein, the olefin-based polymer is selected from an ethylene/alpha-olefin/diene terpolymer or an ethylene/alpha-olefin copolymer.

In one embodiment, or a combination of embodiments describe herein, the olefin-based polymer is an ethylene/alpha-olefin/diene terpolymer, and further an EPDM. In a further embodiment, the diene is ENB.

In one embodiment, or a combination of embodiments describe herein, the olefin-based polymer has a density from 0.850 to 0.940 g/cc, or from 0.855 to 0.935 g/cc, or from 0.860 to 0.930 g/cc, or from 0.865 to 0.925 g/cc (1 cc=1 cm$^3$). In a further embodiment, the olefin-based polymer is an ethylene/alpha-olefin/diene terpolymer, and further an EPDM. In a further embodiment, the diene is ENB.

In one embodiment, or a combination of embodiments describe herein, the olefin-based polymer has a density from 0.850 to 0.880 g/cc, or from 0.855 to 0.875 g/cc, or from 0.858 to 0.870 g/cc. In a further embodiment, the olefin-based polymer is an ethylene/alpha-olefin/diene terpolymer, and further an EPDM. In a further embodiment, the diene is ENB.

In one embodiment, or a combination of embodiments describe herein, the olefin-based polymer has a Mooney Viscosity (ML 1+4, 125° C.) from 10 to 100, or from 20 to 80, or from 30 to 60. In a further embodiment, the olefin-based polymer is an ethylene/alpha-olefin/diene terpolymer, and further an EPDM. In a further embodiment, the diene is ENB.

In one embodiment, or a combination of embodiments describe herein, the olefin-based polymer comprises from 50 wt % to 65 wt %, or from 52 wt % to 62 wt %, of from 54 wt % 60 wt % of C2 (ASTM D3900), based on the weight of the interpolymer. In a further embodiment, the olefin-based polymer is an ethylene/alpha-olefin/diene terpolymer, and further an EPDM. In a further embodiment, the diene is ENB.

In one embodiment, or a combination of embodiments describe herein, the olefin-based polymer has a percent crystallinity ≤50%, or ≤40%, or ≤30%, or ≤20%, or ≤10%, or ≤5.0%. In a further embodiment, the olefin-based polymer is an ethylene/alpha-olefin/diene terpolymer, and further an EPDM. In a further embodiment, the diene is ENB.

In one embodiment, or a combination of embodiments describe herein, the olefin-based polymer has a percent crystallinity ≤10%, or ≤9.0%, or ≤8.0%, or ≤7.0%, or ≤6.0%, or ≤5.0%. In a further embodiment, the olefin-based polymer is an ethylene/alpha-olefin/diene terpolymer, and further an EPDM. In a further embodiment, the diene is ENB.

In one embodiment, or a combination of embodiments describe herein, the olefin-based polymer has a molecular weight distribution (MWD) from 2.0 to 5.0, or from 2.0 to 4.5, or from 2.0 to 4.0, or from 2.0 to 4.5, or from 2.0 to 3.5, or from 2.0 to 3.0. In a further embodiment, the olefin-based polymer is an ethylene/alpha-olefin/diene terpolymer, and further an EPDM. In a further embodiment, the diene is ENB.

In one embodiment, or a combination of embodiments describe herein, the polymer composition comprises ≥95 wt %, or ≥98 wt %, or ≥99 wt % of the olefin-based polymer, based on the weight of the polymer composition. In a further embodiment, the olefin-based polymer is an ethylene/alpha-olefin/diene terpolymer, and further an EPDM. In a further embodiment, the diene is ENB.

In one embodiment, or a combination of embodiments describe herein, the olefin-based polymer is an ethylene/alpha-olefin interpolymer, (for example, an EPDM), which has a density from 0.850 to 0.890 g/cc, or from 0.855 to 0.885 g/cc, or from 0.860 to 0.880 g/cc (1 cc=1 cm$^3$).

In one embodiment, or a combination of embodiments describe herein, the olefin-based polymer is an ethylene/alpha-olefin interpolymer, which has a density from 0.850 to 0.890 g/cc, or from 0.855 to 0.885 g/cc, or from 0.860 to 0.880 g/cc (1 cc=1 cm$^3$). In a further embodiment, the ethylene/α-olefin interpolymer is an ethylene/α-olefin copolymer. Example alpha-olefins are those having from 3 to 8 carbon atoms, such as propylene, 1-butene, 1-pentene, 1-hexene, 1-heptene, and 1-octene.

In one embodiment, or a combination of embodiments describe herein, the olefin-based polymer is an ethylene/alpha-olefin interpolymer, which has a melt index (I2, 190° C. and 2.16 kg) from 0.1 to 50 g/10 min, or from 0.5 to 40 g/10 min, or from 0.8 to 30 g/10 min. In a further embodiment, the interpolymer is an ethylene/α-olefin copolymer. Example alpha-olefins are those having from 3 to 8 carbon atoms, such as propylene, 1-butene, 1-pentene, 1-hexene, 1-heptene, and 1-octene.

In one embodiment, or a combination of embodiments describe herein, the olefin-based polymer is an ethylene/alpha-olefin interpolymer, which has a melt index (I2, 190° C. and 2.16 kg) from 0.1 to 10 g/10 min, or from 0.5 to 8.0 g/10 min, or from 0.8 to 6.0 g/10 min. In a further embodiment, the interpolymer is an ethylene/α-olefin copolymer. Example alpha-olefins are those having from 3 to 8 carbon atoms, such as propylene, 1-butene, 1-pentene, 1-hexene, 1-heptene, and 1-octene.

In one embodiment, or a combination of embodiments describe herein, the olefin-based polymer is an ethylene/alpha-olefin inter-polymer, which has a molecular weight distribution (MWD), from 1.7 to 3.5, or from 1.8 to 3.0, or from 1.8 to 2.8, or from 1.8 to 2.5. In a further embodiment, the interpolymer is an ethylene/α-olefin copolymer. Example alpha-olefins are those having from 3 to 8 carbon atoms, such as propylene, 1-butene, 1-pentene, 1-hexene, 1-heptene, and 1-octene.

In one embodiment, or a combination of embodiments describe herein, the polymer particles comprise a coating on ≥50%, or ≥60%, or ≥70%, or ≥80% of the total surface of the polymer particles.

In one embodiment, or a combination of embodiments describe herein, the polymer particles comprise a coating on ≥85%, or ≥90%, or ≥95%, of the total surface of the polymer particles.

The total surface area of the polymer particles can be calculated from the average pellet dimensions of the particles (for example, pellets) and the weight of the particles per gram; or by a BET analysis (for example, using a BET instrument available from Micromeritics ASAP 2420). The amount of surface area of the polymer particles that has been coated can be determined by visual inspection.

In one embodiment, or a combination of embodiments describe herein, the metal acid and the polysiloxane comprise ≥90 wt %, or ≥95 wt %, or ≥98 wt %, or ≥99 wt % of the total weight of the coating.

In one embodiment, or a combination of embodiments describe herein, the coated particles has an unconfined yield strength, at 0° C., ≤20 lb/ft$^2$, further ≤15 lb/ft$^2$, further ≤10 lb/ft$^2$, further ≤5.0 lb/ft$^2$, further ≤4.0 lb/ft$^2$, further ≤3.0 lb/ft$^2$, further ≤2.0 lb/ft$^2$, further ≤1.0 lb/ft$^2$, further ≤0.5 lb/ft$^2$, further ≤0.2 lb/ft$^2$, further ≤0.1 lb/ft$^2$.

The olefin-based polymer may comprise a combination of two or more embodiments described herein. The ethylene-based polymer may comprise a combination of two or more embodiments described herein. The propylene-based polymer may comprise a combination of two or more embodiments described herein.

In one embodiment, or a combination of embodiments describe herein, the polymer composition comprises at least one additive. Additives include, but are not limited to, antioxidants, ultraviolet absorbers, antistatic agents, colorants (e.g., titanium dioxide, carbon black and pigments), flame retardants, and any combination thereof.

In one embodiment, or a combination of embodiments describe herein, the friable bale comprises ≥95 wt %, or ≥98 wt %, or ≥99 wt % of the coated polymer particles, based on the weight of the friable bale.

Also provided an article comprising at least one component formed from a friable bale as described herein.

Polysiloxane Emulsion

An aqueous polysiloxane emulsion is a composition comprising water and a polysiloxane.

A "polysiloxane" is a polymer that comprises the following repeat unit —(SiR1R2-O)$_n$—, where R1 and R2 are each, independently, a hydrocarbon or a substituted hydrocarbon, and n is greater than, or equal to, 2. As used herein the term "substituted hydrocarbon" refers to a hydrocarbon comprising at least one heteroatom (for example, O, N or P).

In one embodiment, or a combination of embodiments describe herein, R1 and R2 are each, independently, a hydrocarbon, and further an alkyl group.

In one embodiment, or a combination of embodiments describe herein, R1 and/or R2 are/is selected from the following: an alkenyl group, such as, for example, a vinyl group, an allyl group, a butenyl group, a pentenyl group, or a hexenyl group, and preferably a vinyl group; and alkyl group, such as, for example, a methyl group, an ethyl group, a propyl group, a butyl group, a cyclopentyl group, or a cyclohexyl group, or similar cycloalkyl groups; and aryl group, such as, for example, a phenyl group, a tolyl group, a xylyl group, a benzyl group, a phenethyl group, a 3-phenylpropyl groups; an alkoxy group, such as, for example, a methoxy group or an ethoxy groups; a halogenated hydrocarbon group, such as, for example, a 3-chloropropyl group or a 3,3,3-trifluoropropyl group; or an oxime group, such as, for example, a dimethylketoxime group or a methylethylketoxime group.

In one embodiment, or a combination of embodiments describe herein, the polysiloxane is selected from polydimethylsiloxane (PDMS), methyltrimethoxysilane, vinyltrimethoxysilane, methyltrioximesilane or vinyltrioximesilane.

In one embodiment, or a combination of embodiments describe herein, the polysiloxane is selected from a dimethylpolysiloxanes having both molecular terminals capped with dimethylvinylsiloxy groups, a copolymer of methylvinylsiloxane and dimethylsiloxane having dimethylvinylsiloxy groups on both molecular terminals, a methylvinylpolysiloxane having trimethylsiloxy groups at both molecular terminals, or a cyclic methylvinylsiloxane.

In one embodiment, or a combination of embodiments describe herein, the polysiloxane polymer has the structural formula —Si(R1R2)-O—, wherein the R1 and the R2 are each, independently a $C_1$-$C_{18}$ hydrocarbyl groups. In a further embodiment, R1 and the R2 are each, independently, selected from an aliphatic group and an aromatic group. In a further embodiment, each is selected from an aliphatic group, further an alkyl, further methyl.

In one embodiment, or a combination of embodiments describe herein, the polysiloxane has a viscosity, at 25° C., from 200 to 2000 cSt, or from 250 to 1800 cSt, or from 300 to 1600 cSt, or from 350 to 1200 cSt.

Polymer Particles

The term "polymer particles," is in reference to the particles that are coated as described herein. Typical polymer particles are generally substantially platelet, spherical, cylindrical, or rod shape. While the cross-sectional area may vary, depending upon the polymer, preferably, the cross-sectional area of a polymer particle is from $3\times10^{-3}$ square inch ($1.93\times10^{-2}$ square centimeters) to 0.2 square inch (1.29 square centimeters); that is from 1/16 inch (0.15875 cm) to 1/2 inch (1.27 cm) in diameter, if the cross-section is, for example, circular. In one embodiment, the particles have a cross-sectional area from 0.01 square inch ($6.45\times10^{-2}$ square centimeters) to 0.05 square inch (0.322 square centimeters); that is from 0.125 inch (0.3175 cm) to 0.375 inch (0.9525 cm) in diameter, if, for example, the cross-section is circular. In one embodiment, are particles are from 0.25 cm to 0.40 cm in diameter.

The polymer particles are in the form of particulate solids, ranging in size from powders to pellets. Pellets are particulate solids, and are generally, but not exclusively, formed through extrusion and pelletization processes, with a typical average particle size (average of the longest dimension) ≥2 mm, typically from 2 mm to 10 mm, further from 2 mm to 6 mm, and further from 2 mm to 4 mm. Micropellets typically have an average particle size less than that of a standard pellet, yet greater than those average particle sizes produced from general commercial die capabilities. The average particle size of micropellets typically ranges from 200 microns to 2000 microns. The micropellets generally exhibit a semi-spheroidal shape.

In one embodiment, or a combination of embodiments describe herein, the polymer particles are formed from a polymer composition comprising one ethylene/alpha-olefin interpolymer, or at least two ethylene/alpha-olefin interpolymers, which differ in one or more of the following properties: density, Mn, Mw, MWD, comonomer type and/or comonomer content. In one embodiment, or a combination of embodiments describe herein, the polymer particles are formed from a polymer composition comprising one ethylene/alpha-olefin copolymer, or at least two ethylene/alpha-olefin copolymers, which differ in one or more of the following properties: density, Mn, Mw, MWD, comonomer type and/or comonomer content.

In one embodiment, or a combination of embodiments describe herein, the polymer particles are formed from a polymer composition comprising one ethylene/alpha-olefin/diene interpolymer, or at least two ethylene/alpha-olefin/diene interpolymers, which differ in one or more of the following properties: density, Mn, Mw, MWD, comonomer type and/or comonomer content. In one embodiment, or a combination of embodiments describe herein, the polymer particles are formed from a polymer composition comprising one EPDM, or at least two EPDMs, which differ in one or more of the following properties: density, Mn, Mw, MWD, comonomer type and/or comonomer content.

In one embodiment, or a combination of embodiments describe herein, the polymer particles are formed from a polymer composition comprising an ethylene-based polymer, further an ethylene-based interpolymer, and further an ethylene-based copolymer.

The polymer particles may comprise a combination of two or more embodiments described herein. A polymer composition may comprise a combination of two or more embodiments as described herein.

Processes to Form Coated Polymer Particles

In one embodiment, or a combination of embodiments describe herein, the process of forming the coated polymer particles comprises contacting the polymer particles with the metal acid dispersion and polysiloxane emulsion. The polymer particles may be contacted with the metal acid dispersion, either before, after, or simultaneously with, the polysiloxane emulsion. In any event, both the polysiloxane emulsion and the metal acid dispersion should be contacted with the polymer particles, under conditions, such that the polymer particles can be sufficiently physically coated with the desired agent or agents.

In one embodiment, or a combination of embodiments describe herein, such contacting is conducted by a first liquid feeding of part, or all, of the polysiloxane emulsion, onto the polymer particles, or immersing the polymer particles in part, or all, of the polysiloxane emulsion. The metal acid dispersion is then distributed onto the polymer particles that are pre-coated with the polysiloxane emulsion. The means of contacting and distributing may vary, so long as the polymer particles become sufficiently coated with the metal acid dispersion, such that the metal acid dispersion is adhered to the surface of the polymer particles. Usually, the process is sufficient, so long as the average amount of surface coating is ≥50 percent, and preferably ≥60 percent, or ≥80 percent, based on the total surface area of the polymer particles.

In one embodiment, the thickness of the coating is from 1.0 microns to 150 microns, or from 5.0 microns to 100 microns, or from 10 microns to 50 microns. This value may also be expressed in terms of percent increase in the average size of the polymer particles (for example, pellets). This percent increase is generally from 0.01 percent to 15 percent, depending on amount of metal acid dispersion, and the type of method used to apply, and process, the coating.

Examples of blending equipment/processes include any mechanical means of moving the polymer particles, such as, for example, a simple tumbling of a jar, or blending in a conical rotating vessel, ribbon blender, drum tumbler, paddle blender, agglomeration pan and fluidized bed operations. In one embodiment, the coating process includes the use of a pneumatic conveyor, under air or inert gas. Moderate stirring, shaking, or even a short distance of conveying in a screw conveyor, can be sufficient for such adequate distribution of the agent or agents. The type of contacting employed may be the same, or different, for the polysiloxane emulsion and the metal acid dispersion, if the polymer particles are contacted with the emulsion and the dispersion at separate times.

The contacting of the agents (polysiloxane emulsion and/or metal acid dispersion) and the polymer particles can be conducted at any temperature, at which an agent does not evaporate, solidify, become too viscous, or significantly react with the polymer particles. Such temperatures often vary, depending upon the components of the composition, but typically are from −10° C. to 150° C., further from 0° C. to 60° C., or from 5° C. to 35° C.

The coating composition may be spray coated on at least a portion of the surface of the polymer particles to form wet-coated polymer particles. Particles can be dried, for example, in a forced air and/or spin dryer.

Articles

The invention also provides an article comprising at least one component formed from a friable bale as described herein. Articles include, but are not limited to, injection molded articles, thermoformed articles and foams. Additional articles include medical devices (e.g., pressure cuffs and stabilization devices); inflatable articles (e.g., toys, watercraft, cushioning and furniture), sheetings (e.g., awnings, banners, signs, tents, tarpaulins, and liners for pools, ponds or landfills), book bindings, and carriers (e.g., sporting bags and backpacks). Additional articles include automotive parts.

Definitions

Unless stated to the contrary, implicit from the context, or customary in the art, all parts and percents are based on weight, and all test methods are current as of the filing date of this disclosure.

The term "bale," as used herein in reference polymer particles, refers to a compressed mass of such particles, such that ≥50 wt % of the particles are stuck or fused together. Friable refers to the ability of the bale to break into smaller pieces under a force.

The term "baling machine," as used herein, refers to polymer balers, which are heavy duty machines designed for continuous operation to densify low bulk density polymer crumbs/particles to high bulk density polymer bale, and typically using a hydraulic compression force.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts of impurities, such as catalyst residues, may be incorporated into and/or within a polymer.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term, "olefin-based polymer," as used herein, refers to a polymer that comprises, in polymerized form, 50 wt % or a majority amount of olefin monomer, for example ethylene or propylene, (based on the weight of the polymer), and optionally may comprise one or more comonomers.

The term, "ethylene-based polymer," as used herein, refers to a polymer that comprises, in polymerized form, 50 wt % or a majority amount of ethylene monomer (based on the weight of the polymer), and optionally may comprise one or more comonomers.

The term "ethylene/α-olefin interpolymer," as used herein, refers to an interpolymer that comprises, in polymerized form, ethylene monomer (based on the weight of the interpolymer), and at least one α-olefin. In one embodiment, the "ethylene/α-olefin interpolymer," comprises, in polymerized form, 50 wt % or a majority amount of ethylene monomer, based on the weight of the interpolymer.

The term "ethylene/α-olefin/diene interpolymer," as used herein, refers to an interpolymer that comprises, in polymerized form, ethylene monomer, an α-olefin, and a diene. Typically, the "ethylene/α-olefin/diene interpolymer," comprises, in polymerized form, 50 wt % or a majority amount of ethylene monomer, based on the weight of the interpolymer.

The term, "ethylene/α-olefin copolymer," as used herein, refers to a copolymer that comprises, in polymerized form, 50 wt % or a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The term "propylene/α-olefin interpolymer," as used herein, refers to an interpolymer that comprises, in polymerized form, a majority amount of propylene monomer (based on the weight of the interpolymer), and at least one α-olefin.

The term, "propylene/α-olefin copolymer," as used herein, refers to a copolymer that comprises, in polymerized form, a majority amount of propylene monomer (based on the weight of the copolymer), and an α-olefin, as the only two monomer types.

The term "propylene/ethylene interpolymer," as used herein, refers to an interpolymer that comprises, in polymerized form, a majority amount of propylene monomer (based on the weight of the interpolymer), and at least ethylene.

The term, "propylene/ethylene copolymer," as used herein, refers to a copolymer that comprises, in polymerized form, a majority amount of propylene monomer (based on the weight of the copolymer), and ethylene, as the only two monomer types.

The term "aqueous metal acid dispersion," as used herein, refers to a composition comprising water and a metal acid.

The term "metal acid," as used herein, refers to a composition comprising one or more metal fatty acids.

The term "fatty acid," as used herein, refers to a hydrocarbon chain and a terminal carboxyl group. As understood in the art, the fatty acid will be in the anionic form (—C(O)O—). Preferred fatty acids include C12-C20 fatty acids, and further C14-C18 fatty acids, and further C16-C18 fatty acids.

The phrase "a portion of the surfaces of the polymer particles," as used herein, refers to ≥50% of the total surface of the polymer particles. The total surface of the polymer particles can be determined by BET as discussed above. In one embodiment, ≥60%, or ≥70%, or ≥80%, or ≥90% of the total surface of the polymer particles is coated, as described herein. The amount of surface area coated can be determined by visual inspection.

The phrase "drying the wet-coated polymer particles to form the coated polymer particles," and other similar phrases, as used herein, refer to removing the aqueous medium from the surface of the particles. The drying step can be monitored by taking a sample of coated pellets, and analyzing for moisture on the surface of the pellets using Computrac Vapor Pro XL Analyzer (Arizona Instruments). Pellets are heated at 200° C. for 10 minutes, and the presence of water is detected.

The term "coated polymer particles," and other similar terms, as used herein, refer to the coated polymer particles formed, after removing the aqueous medium from the surface of the particles.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Embodiments of the present disclosure include but are not limited to the following:

1. A process to make a friable bale, wherein the friable bale is formed from a composition comprising coated polymer particles, which comprise polymer particles formed from a polymer composition comprising an olefin-based polymer, and a coating formed from a coating composition comprising an aqueous metal acid dispersion, and an aqueous polysiloxane emulsion, said process comprising the following:
    a) adding the coated polymer particles to a container;
    b) allowing the coated polymer particles to mass together to form the friable bale;
    and wherein the friable bale has a compression force ≤1.00 MPa.
2. A process to make a friable bale, wherein the friable bale is formed from a composition comprising coated polymer particles, which comprise polymer particles formed from a polymer composition comprising an olefin-based polymer, and a coating formed from a coating composition comprising an aqueous metal acid dispersion, and an aqueous polysiloxane emulsion, said process comprising adding the coated polymer particles to a baling machine to form the friable bale; and wherein the friable bale has a compression force ≤1.00 MPa.
3. The process of embodiment 1 or embodiment 2, wherein the weight ratio of the polysiloxane to the metal acid, in the coating, is from 0.10 to 1.00.
4. The process of any one of the previous embodiments, wherein the weight ratio of the polysiloxane to the metal acid, in the coating, is from 0.15 to 0.50.
5. The process of any one of the previous embodiments, wherein the metal acid is present in an amount from greater than zero to 5000 ppm, or greater than zero to 2000 ppm, or greater than zero to 1000 ppm, or greater than zero to 500 ppm, or greater than zero to 300 ppm, based on the weight of the coated polymer particles.
6. The process of any one of the previous embodiments, wherein the metal acid is present in an amount from 20 ppm to 5000 ppm, or from 20 ppm to 2000 ppm, or from 20 ppm to 1000 ppm, or from 20 ppm to 500 ppm, or from 20 ppm to 300 ppm, based on the weight of the coated polymer particles.
7. The process of any one of the previous embodiments, wherein the polysiloxane is present in an amount greater than zero to 2000 ppm, or greater than zero to 1000 ppm, or greater than zero to 700 ppm, or greater than zero to 500 ppm, or greater than zero to 300 ppm, based on the weight of the coated polymer particles.
8. The process of any one of the previous embodiments, wherein the polysiloxane is present in an amount from 20 ppm to 2000 ppm, or from 20 ppm to 1000 ppm, or from 20 ppm to 700 ppm, or from 20 ppm to 500 ppm, or from 20 ppm to 300 ppm, based on the weight of the coated polymer particles.
9. The process of any one of the previous embodiments, wherein metal of the metal acid is selected from calcium, zinc or barium.
10. The process of any one of the previous embodiments, wherein the metal acid comprises a metal stearate, and further a calcium stearate.
11. The process of any one of the previous embodiments, wherein the metal acid is comprises a metal stearate, and further a calcium stearate, and a metal C16 fatty acid, and further a calcium C16 fatty acid.
12. The process of any one of the previous embodiments, wherein the metal acid is a metal stearate, and further a calcium stearate.
13. The process of any one of the previous embodiments, wherein the polysiloxane is poly-dimethylsiloxane (PDMS).
14. The process of any one of the previous embodiments, wherein the dispersion and/or the emulsion mixture is added to pelletization water, and wherein the polymer particles are added to the pelletization water.

15. The process of any one of the previous embodiments, wherein the coating composition is not crosslinked.
16. The process of any one of the previous embodiments, wherein the polymer particles are in the form of pellets.
17. The process of any one of the previous embodiments, wherein the olefin-based polymer is an ethylene-based polymer or a propylene-based polymer.
18. The process of embodiment 17, wherein the olefin-based polymer is an ethylene-based polymer.
19. The process of embodiment 18, wherein the ethylene-based polymer is an ethylene/alpha-olefin interpolymer, and further an ethylene/alpha-olefin copolymer.
20. The process of embodiment 17, wherein the olefin-based polymer is a propylene-based polymer.
21. The process of embodiment 20, wherein the propylene-based polymer is a propylene/alpha-olefin interpolymer, and further a propylene/alpha-olefin copolymer, or a propylene/ethylene interpolymer, and further a propylene/ethylene copolymer
22. The process of any one of embodiments 1-17, wherein the olefin-based polymer is an ethylene/alpha-olefin/diene terpolymer, and further an EPDM.
23. The process of any one of the previous embodiments, wherein the olefin-based polymer has a density from 0.850 to 0.940 g/cc.
24. The process of any one of the previous embodiments, wherein the olefin-based polymer has a density from 0.850 to 0.880 g/cc.
25. The process of any one of the previous embodiments, wherein the olefin-based polymer has a Mooney Viscosity (ML 1+4, 125° C.) from 10 to 100.
26. The process of any one of the previous embodiments, wherein the olefin-based polymer has a percent crystallinity ≤50%, or ≤40%, or ≤30%, or ≤20%, or ≤10%, or ≤5.0%.
27. The process of any one of the previous embodiments, wherein the olefin-based polymer has a molecular weight distribution (MWD) from 2.0 to 5.0.
28. The process of any one of the previous embodiments, wherein the polymer composition comprises ≥95 wt %, or ≥98 wt %, or ≥99 wt % of the olefin-based polymer, based on the weight of the polymer composition.
29. A friable bale formed from the process of any one of the previous embodiments.
30. A friable bale comprising coated polymer particles, which comprise polymer particles formed from a polymer composition comprising an olefin-based polymer, and a coating formed from a coating composition comprising an aqueous metal acid dispersion, and an aqueous polysiloxane emulsion; and wherein the metal acid is present in an amount from greater than zero to 5000 ppm, based on the weight of the coated polymer particles; and wherein the polysiloxane is present in an amount from greater than zero to 2000 ppm, based on the weight of the coated polymer particles.
31. The friable bale of embodiment 30, wherein the weight ratio of the polysiloxane to the metal acid, on the dry coated polymer particles is from 0.30 to 1.00.
32. The friable bale of embodiment 30 or embodiment 31, wherein the metal acid is present in an amount from 20 ppm to 5000 ppm, or from 20 ppm to 2000 ppm, or from 20 ppm to 1000 ppm, or from 20 ppm to 500 ppm, or from 20 ppm to 300 ppm, based on the weight of the coated polymer particles.
33. The friable bale of any one of embodiments 30-32, wherein the polysiloxane is present in an amount from 20 ppm to 2000 ppm, or from 20 ppm to 1000 ppm, or from 20 ppm to 700 ppm, or from 20 ppm to 500 ppm, or from 20 ppm to 300 ppm, based on the weight of the coated polymer particles.
34. The friable bale of any one of embodiments 30-33, wherein the metal acid comprises a metal stearate, and further a calcium stearate.
35. The friable bale of any one of embodiments 30-34, wherein metal of the metal acid is selected from calcium, zinc or barium.
36. The friable bale of any one of embodiments 30-35, wherein the metal acid is comprises a metal stearate, and further a calcium stearate, and a metal C16 fatty acid, and further a calcium C16 fatty acid.
37. The friable bale of any one of embodiments 30-36, wherein the metal acid is a metal stearate, and further is a calcium stearate.
38. The friable bale of any one of embodiments 30-37, wherein the polysiloxane is polydimethylsiloxane (PDMS).
39. The friable bale of any one of the embodiments 30-38, wherein the coating is not crosslinked.
40. The friable bale of any one of embodiments 30-39, wherein the polymer particles are in the form of pellets.
41. The friable bale of any one of embodiments 30-40, wherein the olefin-based polymer is an ethylene-based polymer or a propylene-based polymer.
42. The friable bale of embodiment 41, wherein the olefin-based polymer is an ethylene-based polymer.
43. The friable bale of embodiment 42, wherein the ethylene-based polymer is an ethylene/alpha-olefin interpolymer, and further an ethylene/alpha-olefin copolymer.
44. The friable bale of embodiment 41, wherein the olefin-based polymer is a propylene-based polymer.
45. The friable bale of embodiment 44, wherein the propylene-based polymer is a propylene/alpha-olefin interpolymer, and further a propylene/alpha-olefin copolymer, or a propylene/ethylene interpolymer, and further a propylene/ethylene copolymer
46. The friable bale of any one of embodiments 30-41, wherein the olefin-based polymer is an ethylene/alpha-olefin/diene terpolymer, and further an EPDM.
47. The friable bale of any one of embodiments 30-46, wherein the olefin-based polymer has a density from 0.850 to 0.940 g/cc.
48. The friable bale of any one of embodiments 30-47, wherein the olefin-based polymer has a density from 0.850 to 0.880 g/cc.
49. The friable bale of any one of embodiments 30-48, wherein the olefin-based polymer has a Mooney Viscosity (ML 1+4, 125° C.) from 10 to 100.
50. The friable bale of any one of embodiments 30-49, wherein the olefin-based polymer has a percent crystallinity ≤50%, or ≤40%, or ≤30%, or ≤20%, or ≤10%, or ≤5.0%.
51. The friable bale of any one of embodiments 30-50, wherein the olefin-based polymer has a molecular weight distribution (MWD) from 2.0 to 5.0.
52. The friable bale of any one of embodiments 30-51, wherein the polymer composition comprises ≥95 wt %, or ≥98 wt %, or ≥99 wt % of the olefin-based polymer, based on the weight of the polymer composition.
53. The friable bale of any one of embodiments 30-52, wherein the composition comprises ≥95 wt %, or ≥98 wt %, or ≥99 wt % of the polymer particles, based on the weight of the composition.

54. An article comprising at least one component formed from the friable bale of any one of embodiments 30-53.

TEST METHODS

Density is measured according ASTM D792, except for EPDM and similar terpolymers, then density is measured according to ASTM D297.

Melt index ($I_2$) of an ethylene-based polymer is measured at 190° C., under a load of 2.16 kg, according to ASTM D-1238. Melt index ($I_5$) is measured at 190° C., under a load of 5 kg, according to ASTM D-1238. Melt index ($I_{10}$) is measured at 190° C., under a load of 10 kg, according to ASTM D-1238. Melt index ($I_{21}$) is measured at 190° C., under a load of 21.6 kg, according to ASTM D-1238. The melt flow rate (MFR) of a propylene-based polymer is measured in accordance with ASTM D-1238, condition 230° C./2.16 kg.

Mooney Viscosity

Mooney Viscosity (ML1+4 at 125° C.) was measured in accordance with ASTM 1646, with a one minute preheat time and a four minute rotor operation time. The instrument is an Alpha Technologies Mooney Viscometer 2000.

GPC Molecular Weight and Molecular Weight Distribution

Molecular weight is determined using gel permeation chromatography (GPC) on a Waters 150° C. high temperature chromatographic unit, equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 mL/min, and the injection size is 100 microliters. The molecular weight determination is deduced by using narrow molecular weight distribution polystyrene standards (from Polymer Laboratories), in conjunction with their elution volumes. The equivalent polyethylene molecular weights are determined by using appropriate Mark-Houwink coefficients for polyethylene and polystyrene (as described by T. Williams & I. M. Ward, *The Construction of a Polyethylene Calibration Curve for Gel Permeation Chromatography Using Polystyrene Fractions*, 6 J. Polymer Sci. Pt. B: Polymer Letter 621, 621-624 (1968)) to derive the following equation: $M_{polyethylene}=a \times (M_{polystyrene})^b$. In this equation, a=0.4316 and b=1.0.

Number average molecular weight, $M_n$, of a polymer is expressed as the first moment of a plot of the number of molecules, in each molecular weight range, against the molecular weight. In effect, this is the total molecular weight of all molecules, divided by the number of molecules, and is calculated in the usual matter according to the following formula:

$$M_n = \Sigma n_i \times M_i / \Sigma n_i = \Sigma w_i / \Sigma(w_i/M_i), \text{ where}$$

$n_i$=number of molecules with molecular weight $M_i$
$w_i$=weight fraction of material having molecular weight $M_i$
and $\Sigma n_i$=total number of molecules.

Weight average molecular weight, $M_w$, is calculated in the usual manner according to the following formula: $M_w = \Sigma w_i \times M_i$, where $w_i$ and $M_i$ are the weight fraction and molecular weight, respectively, of the $i^{th}$ fraction eluting from the GPC column. The ratio of these two averages, the molecular weight distribution (MWD or $M_w/M_n$), defines the breadth of the molecular weight distribution.

DSC Method

Differential Scanning calorimetry (DSC) is used to measure crystallinity in ethylene-based polymers (PE, or OBC) samples and propylene-based polymer (PP) samples. About five to eight milligrams of sample is weighed and placed in a DSC pan. The lid is crimped on the pan to ensure a closed atmosphere. The sample pan is placed in a DSC cell, and then heated, at a rate of approximately 10° C./min, to a temperature of 180° C. for ethylene-based polymer samples (230° C. for propylene-based polymer samples). The sample is kept at this temperature for three minutes. Then the sample is cooled at a rate of 10° C./min to −60° C. for ethylene-based polymer samples (−40° C. for propylene-based polymer samples), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for ethylene-based polymer samples (165 J/g, for propylene-based polymer samples), and multiplying this quantity by 100 (e.g., for ethylene-based polymer samples, % cryst.=($H_f$/292 J/g)×100; and for propylene-based polymer samples, % cryst.=($H_f$/165 J/g)×100).

Unless otherwise stated, melting point(s) ($T_m$) of each polymer is determined from the second heat curve obtained from DSC, as described above (peak $T_m$). The crystallization temperature ($T_c$) is determined from the first cooling curve (peak TO.

The following examples illustrate the present invention but are not intended to limit the scope of the invention.

EXAMPLES

I. Materials
  Polymer: NORDEL 4570 EPDM, MV (ML1+4, 125° C.)=70, 50 wt % C2, 4.9 wt % ENB, density=0.86 g/cc, available from The Dow Chemical Company.
  Polymer: NORDEL 4640 EPDM, MV (ML1+4, 125° C.)=40, 55 wt % C2, 4.9 wt % ENB, density=0.86 g/cc, available from The Dow Chemical Company.
  Aqueous Calcium Acid (C16 and C18 fatty acids) Dispersion: CHRISCOAT 50EF-SD628, available from GOVI.
  Aqueous PDMS Emulsion: XIAMETER MEM-0024 Emulsion available from Dow Corning.

II. Coating Composition (Mixture of Dispersion and Emulsion)

The aqueous PDMS emulsion (XIAMETER MEM-0024) and aqueous metal acid dispersion (CHRISCOAT 50EF-SD628) were mixed in a stirred vessel, and further diluted with water to reduce the viscosity for ease of application. The ratio of two components (emulsion and dispersion) is determined by the target concentration of PDMS and metal acid on the pellets on dry basis. The excess water is removed from the surface of the pellets during the drying process. The pH of the mixture must be controlled during the mixing process to prevent instability of Calcium Acid dispersion, which may result in paste or lump formation.

Dilution of the dispersion, and subsequent mixture, can result in suspension instability, which can cause formation of paste, clumps and agglomerates. This can be mitigated by modifying the formulation with excess surfactant, or by reducing the shelf-life of diluted mixture, or by keeping the mixture in constant state of agitation. It is beneficial, when the two components (emulsion and dispersion) are independently applied or admixed or diluted, just prior to application (e.g., spraying).

III. Coating of Polymer Pellets

Amount of coating composition applied to the pellets. Determine the amount of pellets. The coated pellets are prepared using the following steps:
  a. Application of aqueous formulation or components
  b. Drying
  c. Cooling (optional)

The amount of PDMS emulsion and Calcium Stearate dispersion required to achieve a target coating level can be determined as follows:

Amount of pellets to be coated, kg=W
Solids concentration in Calcium Stearate Dispersion, %=C
PDMS concentration in emulsion, %=P
Target concentration of PDMS on pellet surface on dry basis, ppm=p
Target concentration of Ca Acid on pellet surface on dry basis, ppm=c
Required amount of Ca Acid dispersion, kg=(c.W)/C×$10^{-4}$
Required amount of PDMS emulsion, kg=(p.W)/P×$10^{-4}$
Water is removed during the drying step.

Conversely, the coating level on pellets (dry basis) can be calculated from the amount of dispersion and emulsion applied to the pellets. $c=CW_D/W \times 10^4$ and $p=PW_E/W \times 10^4$.

Description of Coating Mechanism—spray followed by a mixing, and then a drying step. The EPDM pellets were spray coated with the target amount of partitioning agents. Then the EPDM pellets and portioning agent were well mixed and dried to dry off the aqueous moisture. After drying, the coated EPDM pellets were transferred to empty bags which were sealed and stacked in the box to form bales.

Coating Composition: mixture of Ca Acid dispersion and PDMS emulsion. Table 1 lists all of the coating compositions for NORDEL 4570 or NORDEL 4640 (3/1 (Ca Acid/PDMS) to 1/3 (Ca Acid/PDMS)). Each ppm amount, in the tables below, is based on weight of dried pellets.

TABLE 1

|  | 8-1 | 8-2 | 8-3 | 8-4 | 8-5 | 8-6 | 8-7 | 9-3 | 9-4 | 9-5 | 9-6 |
|---|---|---|---|---|---|---|---|---|---|---|---|
| Polymer | 4570 | 4570 | 4570 | 4570 | 4570 | 4570 | 4570 | 4570 | 4570 | 4640 | 4640 | 4640 |
| Ca Acid (ppm) | 0 | 1000 | 2000 | 3000 | 4000 | 5000 | 0 | 70 | 3000 | 0 | 100 | 150 |
| PDMS (ppm) | 150 | 217 | 433 | 650 | 867 | 1083 | 150 |  | 650 | 150 |  |  |

IV. Bag Study

Bag study—bag lined box—amount of coated pellets (25 kg) in each bag, seal the bag, and store sealed (ambient temperature and ambient pressure) bag. The sealed 25 kg bags were stacked in boxes (5 bags each layer, total 8 layers in each boxes). Usually, it takes from 2 to 7 days to allow the bags settle in the box. After that, the boxes were inverted, to compress the top layers, now at the bottom of the box, and to expose the originally compressed bottom layers, now the top of the box. After 2-7 days, the bales (bags) from the boxes were taken to study the friability of the bales within each bag, using a compression force test.

Compression Force (Bale Friability)

The compressive force test was conducted on an electro-mechanical testing frame (INSTRON Model #5565). The bale samples were pre-cut in a dimension of 4"×4"×4". Dimensions of each sample were measured, and entered into the test method software, for the compressive stress calculation. The sample was placed between two circular rigid metal platens of approximately 6 inches in diameter. A compressive pre-load of 8-10N was applied to the sample. The displacement was zeroed at this point, and the test was started. The sample was compressed at a rate of 1"/min, up to 2.5" of compressive deformation, or until sample failure. Load and displacement data were recorded, and the peak compressive load (compression force) was reported. The software generates raw data files with all channel data points, as well as a report file. Results are shown in Table 2. As seen in Table 2, the inventive bales are friable, and collapse at minimal compression force.

TABLE 2

| Bale# | | 8 | 9 | 10 | 11 | 12 |
|---|---|---|---|---|---|---|
| Coated Pellets | Control | 8-1 | 8-2 | 8-3 | 8-4 | 8-5 |
| Ca Acid/PDMS (ppm/ppm) | 0/150 | 1000/217 | 2000/433 | 3000/650 | 4000/867 | 5000/1083 |
| Peak Stress (MPa) (compression force) | 1.87 | 0.53 |  | 0.45 |  | 0.44 |
| Under Compression Bale Fail or not | No | Yes | Yes | Yes | Yes | Yes |

Bale Friability by Roll Mill:

The bale friability test was done with a 4"×4"×4" EPDM rubber block. The EPDM rubber block was passed through the nip of a lab two roll mill. The mill temperature was set at 100° F., the nip distance was set at 0.15", the speed of the front roll was at 15 RPM, and speed of the back roll was at 12 RPM. After the material passed through the roll mill nip, its bale friability was examined. The bale was friability if it broke apart through the roll mill. Results are shown in Table 3. As seen in Table 3, the inventive bales are friable.

TABLE 3

| Bale# | | 8 | 10 | 12 |
|---|---|---|---|---|
| Coated Pellets | Control | 8-1 | 8-3 | 8-5 |
| Ca Acid/PDMS (ppm/ppm) | 0/150 | 1000/217 | 3000/650 | 5000/1083 |
| Bale Fail (Broke apart) or not | No | Yes | Yes | Yes |

Bale Friability by Bale Cutter

The compressed bales were cut with a bale cutter to visually inspect the friability of the bales. The observation is listed below. Results are shown in Table 4—the inventive bales are friable.

TABLE 4

| | 8-1 | 8-2 | 8-3 | 8-4 | 8-5 | 8-6 | 9-1 | 9-2 | 9-3 | 9-4 | 9-5 | 9-6 |
|---|---|---|---|---|---|---|---|---|---|---|---|---|
| Polymer | 4570 | 4570 | 4570 | 4570 | 4570 | 4570 | 4570 | 4570 | 4570 | 4640 | 4640 | 4640 |
| Ca Acid (ppm) | 0 | 1000 | 2000 | 3000 | 4000 | 5000 | 0 | 70 | 3000 | 0 | 100 | 150 |
| PDMS (ppm) | 150 | 217 | 433 | 650 | 867 | 1083 | 150 | | 650 | 150 | | |
| Friability | No | Yes | Yes | Yes | Yes | Yes | No | Yes | Yes | No | Yes | Yes |

The invention claimed is:

1. A process to make a friable bale, wherein the friable bale is formed from a composition comprising coated polymer particles, which comprise polymer particles formed from a polymer composition comprising an olefin-based polymer, and a coating formed from a coating composition comprising an aqueous metal acid dispersion, and an aqueous polysiloxane emulsion, said process comprising the following:
   a) adding the coated polymer particles to a container;
   b) allowing the coated polymer particles to mass together to form the friable bale;
   wherein the friable bale has a compression force ≤1.00 MPa; and wherein the metal acid is present in an amount from greater than zero to 5000 ppm, or greater than zero to 2000 ppm, or greater than zero to 1000 ppm, or greater than zero to 500 ppm, or greater than zero to 300 ppm, based on the weight of the coated polymer particles.

2. A process to make a friable bale, wherein the friable bale is formed from a composition comprising coated polymer particles, which comprise polymer particles formed from a polymer composition comprising an olefin-based polymer, and a coating formed from a coating composition comprising an aqueous metal acid dispersion, and an aqueous polysiloxane emulsion, said process comprising adding the coated polymer particles to a baling machine to form the friable bale; and wherein the friable bale has a compression force ≤1.00 MPa.

3. The process of claim 1, wherein the weight ratio of the polysiloxane to the metal acid, in the coating, is from 0.10 to 1.00.

4. The process of claim 1, wherein the weight ratio of the polysiloxane to the metal acid, in the coating, is from 0.15 to 0.50.

5. The process of claim 1, wherein the metal acid is present in an amount from 20 ppm to 5000 ppm, or from 20 ppm to 2000 ppm, or from 20 ppm to 1000 ppm, or from 20 ppm to 500 ppm, or from 20 ppm to 300 ppm, based on the weight of the coated polymer particles.

6. The process of claim 1, wherein the polysiloxane is present in an amount greater than zero to 2000 ppm, or greater than zero to 1000 ppm, or greater than zero to 700 ppm, or greater than zero to 500 ppm, or greater than zero to 300 ppm, based on the weight of the coated polymer particles.

7. The process of claim 1, wherein the polysiloxane is present in an amount from 20 ppm to 2000 ppm, or from 20 ppm to 1000 ppm, or from 20 ppm to 700 ppm, or from 20 ppm to 500 ppm, or from 20 ppm to 300 ppm, based on the weight of the coated polymer particles.

8. The process of claim 1, wherein metal of the metal acid is selected from calcium, zinc or barium.

9. The process of claim 1, wherein the metal acid comprises a metal stearate, and further a calcium stearate.

10. The process of claim 1, wherein the metal acid comprises a metal stearate, and further a calcium stearate, and a metal C16 fatty acid, and further a calcium C16 fatty acid.

11. The process of claim 1, wherein the metal acid is a metal stearate, and further a calcium stearate.

12. The process of claim 1, wherein the polysiloxane is poly-dimethylsiloxane (PDMS).

13. The process of claim 1, wherein the dispersion and/or the emulsion mixture is added to pelletization water, and wherein the polymer particles are added to the pelletization water.

14. The process of claim 1, wherein the coating composition is not crosslinked.

* * * * *

UNITED STATES PATENT AND TRADEMARK OFFICE
CERTIFICATE OF CORRECTION

| | | |
|---|---|---|
| PATENT NO. | : 12,098,267 B2 | Page 1 of 1 |
| APPLICATION NO. | : 17/256996 | |
| DATED | : September 24, 2024 | |
| INVENTOR(S) | : Guang Ming Li et al. | |

It is certified that error appears in the above-identified patent and that said Letters Patent is hereby corrected as shown below:

On the Title Page

Item (72), "Rerni A. Trottier" is listed as the 3rd inventor but the first name should be "Remi".

Signed and Sealed this
Eleventh Day of March, 2025

Coke Morgan Stewart
*Acting Director of the United States Patent and Trademark Office*